United States Patent Office 3,113,643
Patented Dec. 10, 1963

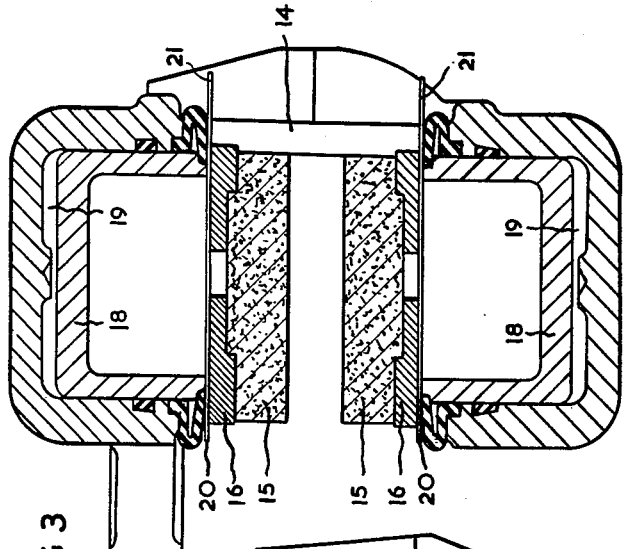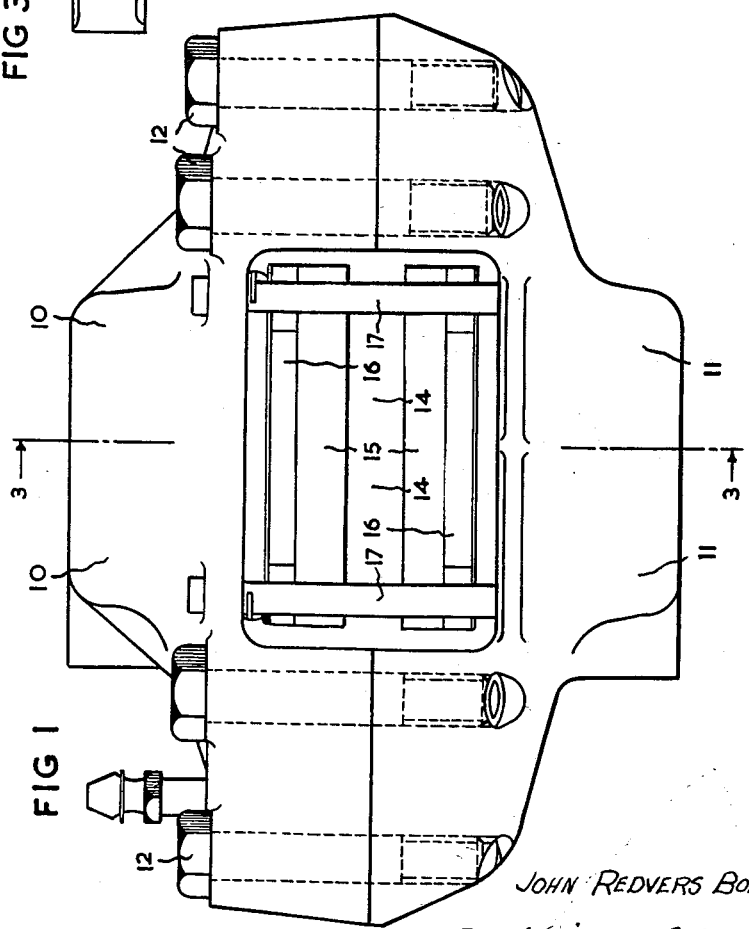

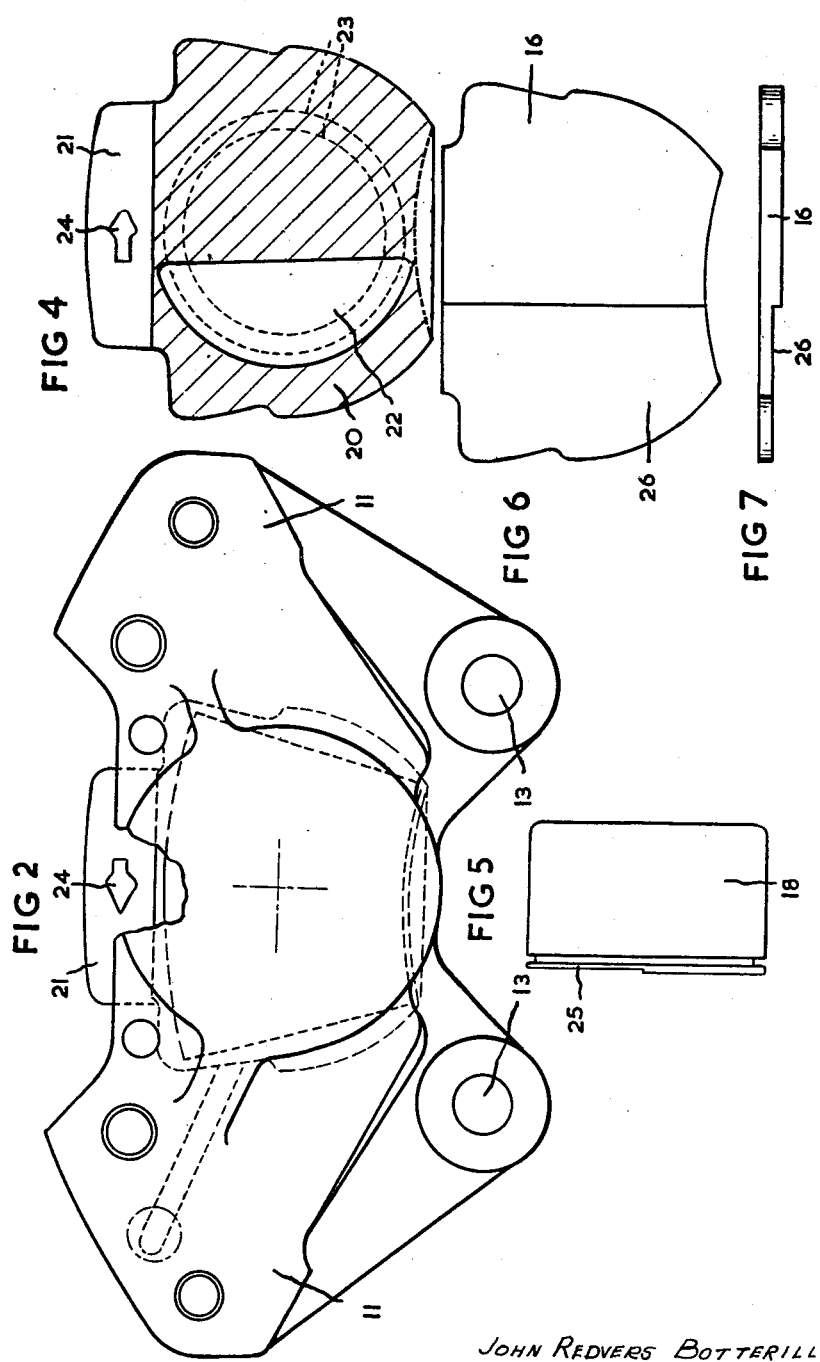

3,113,643
ACTUATOR FOR A SPOT TYPE DISC BRAKE ACTING OVER A PARTIAL AREA OF A DISC BRAKE FRICTION PAD, SAID AREA SPACED CIRCUMFERENTIALLY FROM THE AXIS OF THE ACTUATOR
John Redvers Botterill, Solihull, England, assignor to Girling Limited, Birmingham, England, a British company
Filed Feb. 20, 1961, Ser.No. 90,564
Claims priority, application Great Britain Feb. 27, 1960
8 Claims. (Cl. 188—73)

This invention relates to improvements in disc brakes or clutches of the kind in which a friction pad is urged into engagement with a rotatable disc by a piston working in an hydraulic cylinder of which the axis is substantially at right angles to the plane of the disc. The friction pad is bonded or otherwise secured to a rigid backing plate which is usually directly engaged by the piston.

Experiments indicate that one of the causes of squeal which is liable to occur when the friction pad is applied to the disc is the rigidity of the engagement between the piston and the backing plate of the pad.

According to our invention, in a brake or clutch of the kind set forth, the piston is arranged to engage the backing plate of the friction pad over an area which is not symmetrical with respect to the axis of the hydraulic cylinder.

For example, there may be interposed between the backing plate of the friction pad and the piston a shim of which a part is cut out over a portion of what would normally be the area of contact between the piston and the backing plate whereby, when fluid pressure is applied to the piston, it applies a thrust to the backing plate only over the remainder of that area.

Alternatively, a portion of the inner end of the piston may be stepped or set back from the remainder or a portion of that area of the backing plate normally engaged by the inner end of the piston may be stepped or cut back so that the piston engages the backing plate over an area which is offset with respect to the axis of the hydraulic cylinder.

Tests have shown that it is preferable to cut out the shim or step or set back the piston or backing plate on the side of the axis of the cylinder or the centre of the friction pad with which any given point on the disc first comes into alignment, so that the centre of the area of contact between the piston and the backing plate lies on the other side of the axis of the cylinder or the centre of the pad. This assists in ensuring substantially even wear of the pad over the whole of its area.

Some practical embodiments of our invention are illustrated by way of example in the accompanying drawings in which:

FIGURE 1 is a plan of the caliper of a disc brake incorporating one form of our invention;
FIGURE 2 is a side elevation of the caliper;
FIGURE 3 is a section of the caliper on the line 3—3 of FIGURE 1;
FIGURE 4 is a front elevation of one of the shims used in the caliper shown in FIGURES 1 to 3;
FIGURE 5 is a side elevation of an hydraulic piston modified in accordance with our invention; and
FIGURES 6 and 7 are a front elevation and plan respectively of a backing plate for a friction pad modified in accordance with our invention.

The caliper illustrated in FIGURES 1 to 3 is of a known construction. The caliper comprises two complementary castings 10, 11 secured together by bolts 12. The caliper is adapted to straddle a portion of a rotatable disc (not shown) and is secured to a stationary part adjacent to the disc by bolts passing through holes 13 in lugs projecting inwardly from one of the castings. In the outer side of the caliper there is a rectangular opening 14 of sufficient dimensions to permit the insertion and removal through the opening of friction pads 15 which are adapted to engage opposite sides of the disc and are carried by rigid steel backing plates 16 guided in the caliper for movement towards and away from the disc. The friction pads and backing plates are normally retained in position by removable pins 17 extending transversely across the opening and engaging the outer edges of the backing plates at each end.

The friction pads are urged into engagement with the disc by pistons 18 working in hydraulic cylinders 19 in the caliper limbs when fluid under pressure is forced into the closed outer ends of the cylinders from a master cylinder or other source of fluid under pressure.

Usually the inner or thrust transmitting end parts of the pistons engage directly with a thrust receiving part at the rear face of the backing plates 16, but according to our invention there is interposed between each piston and the corresponding backing plate a shim 20 of the form shown more particularly in FIGURE 4 and which may serve as a thrust receiving part.

The shim has substantially the same outline as the backing plate 16, the outline of the backing plate being shown by the hatched part in FIGURE 4, but the outer edge of the shim is extended outwardly beyond the backing plate as shown at 21.

An opening 22 having the outline of a segment of a circle is pierced in the shim to one side of the axis of the cylinder 18. The radius of the arcuate outer edge of the opening 22 is slightly greater than the radius of the cylinder bore, and the straight side of the opening is parallel to a radius of the disc passing through the axis of the cylinder and is spaced a short distance from that axis. The position of the end of the piston in relation to the opening 22 in the shim is indicated by the dotted circles 23 in FIGURE 4 which represent the annular inner end of the piston.

An arrow 24 is pierced in the extension 21 of the shim which projects outwardly beyond the backing plate to indicate to a person assembling or servicing the brake that the shim should be inserted with the arrow pointing in the normal direction of rotation of the disc.

With the shim in that position the opening 22 lies on the side of the axis of the hydraulic cylinder with which any given point on the disc first comes into alignment.

When the hydraulic cylinder is pressurized the piston is advanced and applies pressure to the backing plate and friction pad through the shim over the area of the shim lying within the dotted circles 23 and outside the opening 22, the centre of that area being offset from the axis of the cylinder and lying on the opposite side of the axis from the opening 22.

The shim will normally be made of pen steel or similar hard resilient material, and the presence of the shim between the piston and the backing plate of the friction pad as well as the offsetting of the engagement between these members eliminates or materially reduces any tendency for the brake to squeal when the friction pads are applied to the disc.

The offsetting of the engagement between the piston and the backing plate of the friction pads can also be obtained by either of the methods shown in FIGURES 5 and 6.

FIGURE 5 is a side elevation of an hydraulic piston in which a portion 25 of the inner end of the piston is stepped or set back from the remainder. The stepped or set back portion should lie on the side of the axis of the cylinder with which any given point on the disc first comes into alignment, and to ensure that the piston remains in the correct angular position any convenient means may be provided for holding the piston against angular movement in the cylinder bore.

FIGURES 6 and 7 show a backing plate of which a portion of the face which is adapted to be engaged by the piston is stepped or set back as shown at 26, the stepped or set back portion extending into the area which would normally be engaged by the piston so that the piston engages the backing plate over an area which is offset with respect to the axis of the hydraulic cylinder.

I claim:

1. A disc brake comprising a rotatable disc, a stationary housing straddling a portion of the periphery of the disc, a rigid backing plate guided in said housing for movement therein only towards and away from the disc, a friction pad carried by said backing plate for engagement with the disc, an hydraulic cylinder in the housing, the axis of the cylinder being at right angles to the plane of the disc, and a piston working in the cylinder and engaging the backing plate only over an area which is offset circumferentially with respect to the centre of the area of the friction pad in a direction such that the centre of the area over which the piston engages the backing plate is located on the side of the axis of the cylinder opposite to that with which any given point on the disc first comes into alignment when the disc is rotating in its normal direction.

2. A disc brake as in claim 1 wherein the circumferential offsetting of the area of engagement of the piston with the backing plate is provided by setting back the inner end of the piston over a portion of its area.

3. A disc brake as in claim 1 wherein the circumferential offsetting of the area of engagement of the piston with the backing plate is provided by setting back a portion of the area of the backing plate.

4. A disc brake comprising a rotatable disc, a stationary housing, a rigid backing plate movable in said housing towards and away from the disc and carrying a friction pad for engagement with the disc, an hydraulic cylinder in the housing, the axis of the cylinder being substantially at right angles to the plane of the disc, a piston working in the cylinder and adapted to apply a thrust to the backing plate to urge the friction pad into engagement with the disc, and a shim interposed between said piston and backing plate, said shim having a cut-out portion of the outline of a segment of a circle of a radius substantially equal to that of the piston and being positively located in the housing in such a position that the cut-out portion of the shim is located on that side of the axis of the cylinder with which any given point on the disc first comes into alignment when the disc is rotating in its normal direction whereby the centre of the area over which the piston applies a thrust to the backing plate lies on the other side of the axis of the cylinder.

5. A disc brake comprising a rotatable disc, a stationary housing straddling a portion of the disc, a rigid backing plate having front and rear faces and being guided in said housing for movement therein only towards and away from the disc, a friction pad carried by the front face of said backing plate for engagement with the disc, a hydraulic cylinder in the housing, the axis of the cylinder being at right angles to the plane of the disc, a piston working in the cylinder, a thrust transmitting part on the forward end of said piston, a thrust receiving part at the rear of said backing plate and engaged by the thrust transmitting part of said piston for effecting movement of said friction pad towards and away from said disc, one of said parts being recessed over an area which is offset circumferentially with respect to the center of the area of the friction pad in a direction such that the thrust of said piston is exerted against said thrust receiving part only over an area circumferentially clear of the recessed area and whose center is located on the side of the axis of the cylinder opposite to that with which any given point on the disc first comes into alignment when the disc is rotated in its normal direction.

6. A disc brake as in claim 5 wherein the recess is provided by setting back the forward end of said piston over a portion of its area.

7. A disc brake as in claim 5 where the recess is provided by setting back a portion of the rear face of the backing plate.

8. A disc brake as in claim 5 wherein said thrust receiving part comprises a shim interposed between the rear face of said backing plate and the forward end of said piston, and said offset circumferential area for receiving the thrust of said piston is provided by a recess in said shim.

References Cited in the file of this patent

UNITED STATES PATENTS

| | | |
|---|---|---|
| 2,926,757 | Armstrong | Mar. 1, 1960 |
| 2,937,722 | Ruet | May 24, 1960 |
| 2,976,956 | Behles | Mar. 28, 1961 |
| 2,997,137 | Hodkinson | Aug. 22, 1961 |
| 3,042,152 | Butler | July 3, 1962 |